Aug. 23, 1960 J. KLINE ET AL 2,950,453
TUNABLE CAVITY FOR HIGH-FREQUENCY GENERATORS
Filed Dec. 21, 1956 3 Sheets-Sheet 1

Fig. I

Jack Kline
Donald L. Winsor
*INVENTORS*

Aug. 23, 1960     J. KLINE ET AL     2,950,453
TUNABLE CAVITY FOR HIGH-FREQUENCY GENERATORS
Filed Dec. 21, 1956     3 Sheets-Sheet 2

Jack Kline
Donald L. Winsor
INVENTORS

Aug. 23, 1960   J. KLINE ET AL   2,950,453
TUNABLE CAVITY FOR HIGH-FREQUENCY GENERATORS
Filed Dec. 21, 1956   3 Sheets-Sheet 3

Jack Kline
Donald L. Winsor
INVENTORS tunable cavity for high-frequency generators and, more visible in Fig. 2, of such configuration as to support high-frequency oscillations at a predetermined frequency, for example, 10 kilomegacycles. As shown in Fig. 1, the cavity 11 is connected through an iris 13 in shunt with a rectangular waveguide 14. The guide 14 is connected to a pair of end flanges 15 to permit assembly in a high-frequency oscillator circuit not shown. The cavity is tuned by means of a rotatable end cap 16 having a serrated circumference in order to be driven by a worm-gear 17. The gear 17 is carried by a pair of bearings 18 affixed to the housing 10 through a support plate 21 and is coupled to a shaft 19 to enable either manual or motor driven control of the cavity resonant frequency. The end cap 16 has radial graduations marked thereon to provide an index of the frequency of oscillation. A retaining plate 20 is connected to the supporting plate 21. The plate 20 has an index marked to indicate the instantaneous position of the cavity.

2,950,453

TUNABLE CAVITY FOR HIGH-FREQUENCY GENERATORS

Jack Kline, Concord, and Donald L. Winsor, Waltham, Mass., assignors, by mesne assignments, to Sanders Associates, Inc., Nashua, N.H., a corporation of Delaware Filed Dec. 21, 1956, Ser. No. 629,815

5 Claims. (Cl. 333—83)

The present invention relates to high-frequency generators. More particularly, the invention relates to tunable resonant cavities for use with high frequency oscillators, such as magnetrons.

Tunable cavities in the prior art depend upon varying the dimensions of the cavity to vary the resonant frequency. In the case of a cylindrical cavity, for example, it is common to vary the axial position of an end wall with respect to the inside surface of a conductive cylindrical tube. Such devices are severely limited in their application, for example, in high-power resonant oscillator circuits.

It is therefore an object of the invention to provide an improved tunable resonant cavity for high-frequency generator devices.

A further object of the invention is to provide an improved tunable resonant cavity useful in generating relatively high-powered signals.

A still further object of the invention is to provide an improved tunable resonant cavity that is hermetically sealed and vacuum tight.

Yet another object of the invention is to provide an improved tunable resonant cavity that can be precisely controlled.

In accordance with the invention, there is provided a tunable cavity for high-frequency generator devices. The cavity comprises a housing and a fixed conductive shell affixed to the housing, and of such configuration as to support high-frequency oscillations at a predetermined frequency. A movable conductive shell is provided of such configuration as to support high-frequency oscillations at a predetermined frequency. The movable shell is so movably mounted relative to the fixed shell as to provide a cavity tunable over a predetermined range of frequency.

For a better understanding of the present invention, together with other and further objects thereof, reference is made to the following description taken in connection with the accompanying drawings and its scope will be pointed out in the appended claims.

Figure 1:
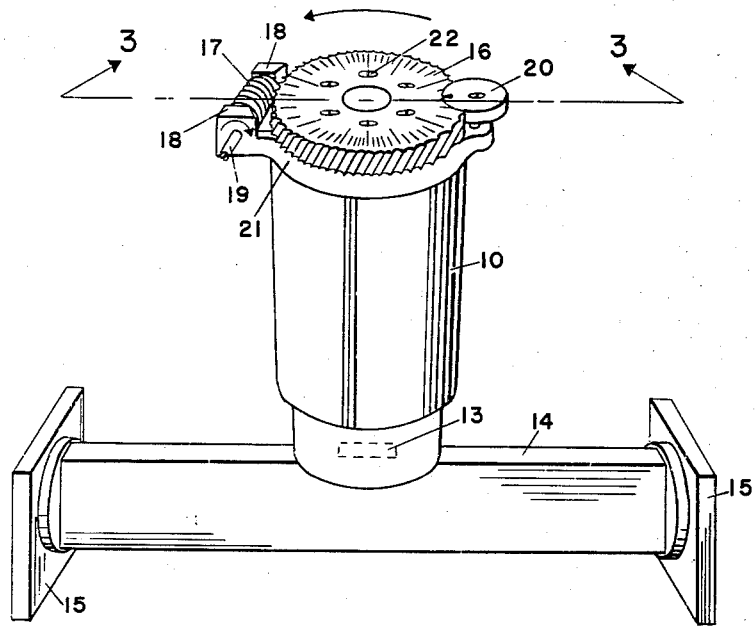
Fig. 1 is a perspective view of a tunable cavity embodying the invention.
Figure 2:
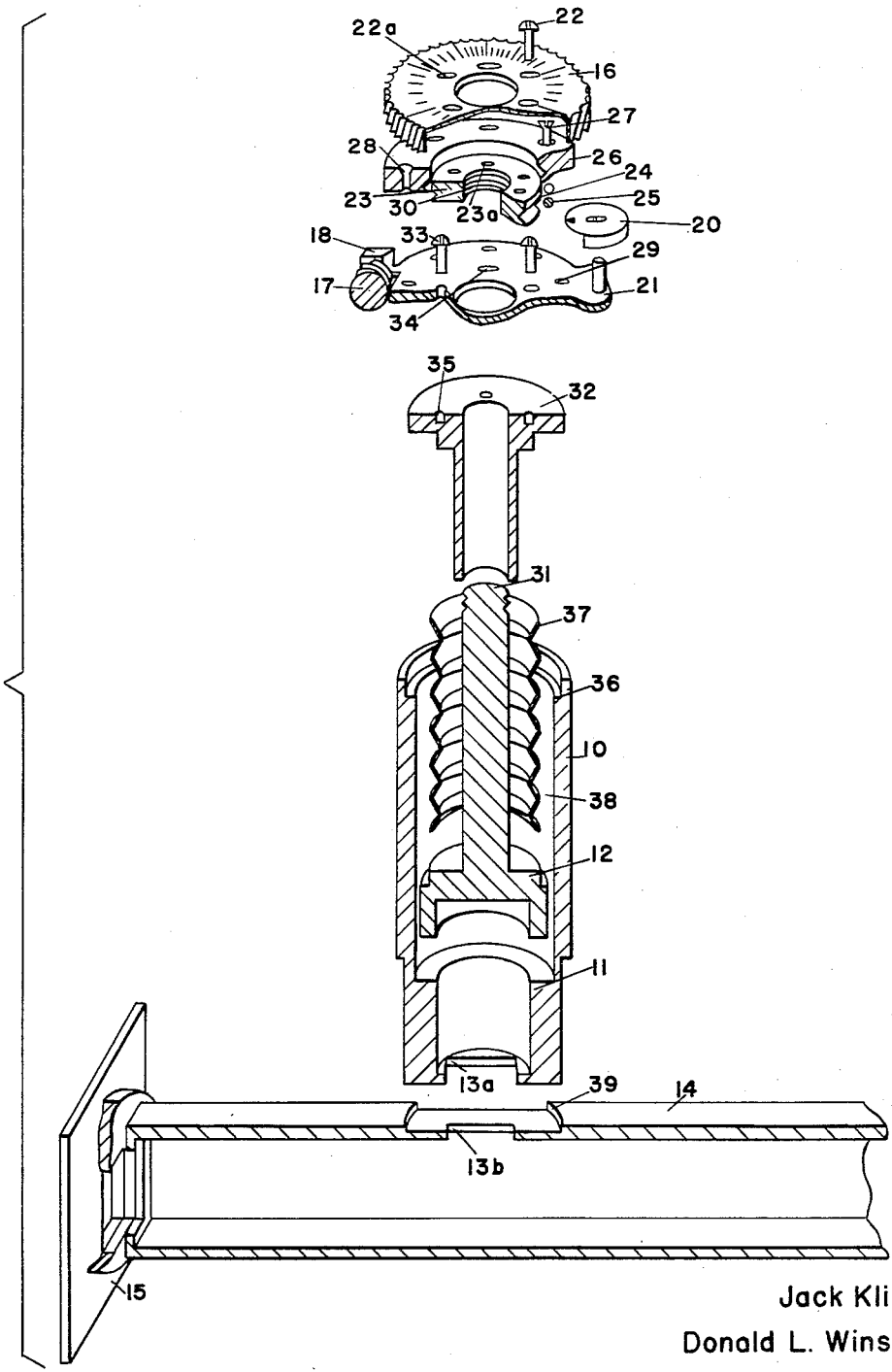
Fig. 2 is an exploded view, partly in section and partly fragmentary, of the tunable cavity in Fig. 1.
Figure 3:
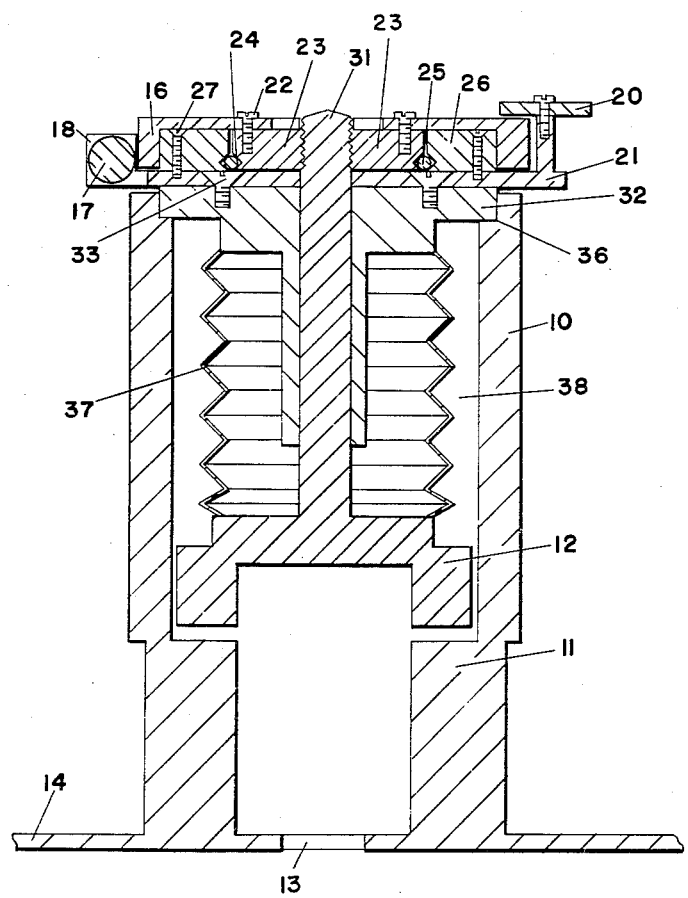
Fig. 3 is a sectional view of the tunable cavity in Fig. 1 taken along the lines 3—3.

Description of the tunable cavity in Figs. 1, 2 and 3

Referring now to the drawings, there is presented a tunable cavity for high-frequency generator devices. The cavity includes a housing 10 and, more visible in Fig. 2, a fixed conductive shell 11 affixed to the housing. The fixed conductive shell 11 is of such configuration as to support high-frequency oscillations at a predetermined frequency, for example, 10 kilomegacycles. Still referring to Fig. 2, a movable conductive shell 12 is provided As shown more particularly in Figs. 2 and 3, the end plate 16 is connected by screws 22 inserted through clearance holes 22a to threaded holes 23a in a rotatable bearing member 23. The member 23 has a conical groove 24 to support a number of thrust ball bearings 25. A retaining plate member 26 is connected to the supporting plate 21 by a plurality of screws 27 inserted through clearance holes 28 in the member 26 and threaded into holes 29 in the supporting plate 21. The member 23 has a central threaded hole 30 which is mated to a threaded shaft 31 affixed to the movable cylinder shell 12. The supporting plate 21 is affixed to a flanged cylindrical bearing member 32 by means of a plurality of screws 33 through clearance holes 34 in the plate 21 and secured in threaded holes 35 in the member 32. The bearing member 32 is assembled to the housing 10 by inserting the flanged portion into a groove 36, for example, soldering it to the housing 10.

A bellows 37 which may be resilient is sealed to the member 32 and to the upper outside surface of the movable shell 12, for example, by soldering. The bellows thus provide a chamber 38 which may be evacuated and hermetically sealed while enabling the chamber size to be varied. A circular slot 39 is formed in the guide 14 to enable assembly of the cavity to the guide by inserting an end in the slot 39. The cavity and the guide are then, for example, soldered together. The iris 13 is then formed by a rectangular opening 13a in the bottom of the cavity which is placed in registration with and adjacent a rectangular opening 13b in the guide. The openings 13a and 13b and the lower section of the cavity 11, as shown, provide a transformer. The transformer effectively couples energy from the first cylinder 11 through said enclosed end to provide a suitable impedance match to an output coupling device, for example, the guide 14.

Operation of the tunable cavity

The resonant frequency of the cavity is essentially determined by its physical characteristics and, more particularly, is inversely proportional to certain critical dimensions. The resonant cavity is essentially formed by the inside surface of the conductive shells 11 and 12, together with the inside surfaces of the adjacent inner-surface of the housing 10. Rotation of the shaft 19, for example clockwise, causes the end cap 16 to rotate counter-clockwise. The cap 16, being affixed to the rotatable bearing member 23, causes it to rotate counter-clockwise also. The counter-clockwise motion of the member 23 directs the shaft 31 and consequently the movable shell 12 downwardly in opposition to air pressure operating against a vacuum within the resilient bellows 37. The shaft 31 does not rotate; its motion is restricted to a translation along the vertical axis. It will be apparent that downward motion of the shell 12 tends to decrease the resonant frequency of oscillation of the resonant cavity formed by the inside surfaces of the shells 11 and 12. Conversely, upward motion of the shell 12 causes the resonant frequency of the cavity to be decreased. The vertical dimension of the inner surface of the shell 11 is so chosen in the embodiment shown as to provide a proper impedance match between the cavity and the waveguide through the iris 13.

While applicants do not intend to be limited to any particular shapes or sizes or parts in the embodiment of the invention just described, there follows a set of dimensions of component parts which have been found to be particularly suitable for a tunable cavity of the type represented in the drawings:

| | Inches |
|---|---|
| Height of the inner surface of the shell 12 | .451 |
| Diameter of the inner surface of the shell 12 | .9385 |
| Height of the inner surface of the shell 11 | 1.592 |
| Diameter of the inner surface of the shell 11 | .9395 |
| Length of the iris 13 | .502 |
| Width of the iris 13 | .410 |
| Travel distance of the shell 12 | .125 to .250 |
| Height of the guide 14 | 1.125 |
| Width of the guide 14 | .5 |

The tunable cavity of the present invention has been found to be particularly suitable for high power applications. Electric field strength of a typical cylindrical resonant cavity is most intense in the middle of the cavity and becomes weaker as one approaches the end walls. It is to be noted, however, that the differential voltages between any two points between the center cavity along a given conducting surface is very small. As the two conductive shells are separated a fringe field effect occurs in which the fields from the shell 12 overlap the fields from the shell 11. Because of the overlapping fields, the cavities may be separated a substantial amount without introducing a differential voltage between the two shells. Because of the relatively low differential voltages appearing between the two shells, no arcing occurs. The outside surface of the movable shell 12 may be covered with a thin layer of insulating material to provide noise-free operation.

The cavity of the present invention exhibits certain other advantages in addition to those enumerated above. Prior art cavities, for example, are subject to numerous modes of oscillation. In general, only one mode or frequency of operation is desired; hence, these other modes are extraneous, undesirable and serve only to degrade the desired signal. In the prior art, attenuators are placed in such a position as to damp out unwanted modes. In contrast, the cavity of the present invention inherently damps out or loads down extraneous modes of oscillation. In the present cavity, extraneous modes develop high surface currents across the gap to load down the cavity and preclude it from supporting undesirable oscillations. For the design mode, however, no such current appears across the gap since the distribution of electric fields is such that no potential is developed across the gap. The cavity of the present invention exhibits extraordinary linearity relative to changes in frequency of oscillation that accompany a given change in the position of the movable shell.

Prior art cavities are inherently non-linear in this regard because they must be coupled with elements which exhibit impedance changes with changes in frequency. In particular, where an iris coupling is used between the cavity and a wave guide transmission line, the reactance presented by the iris changes when the dimensions of the cavity are changed. The present cavity, however, introduces a reactive element, when the gap between the shells is open, which cancels the changes in reactance of the iris. In order to accomplish this result, the proper cavity dimensions must be chosen. In practice this is done experimentally.

It will be apparent that a coaxial line resonator may be constructed utilizing the principles of the present invention.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A tunable cavity for high-frequency generator devices, comprising: a housing; a fixed conductive shell affixed to said housing and of such configuration as to support high frequency oscillations at a predetermined frequency; and a movable conductive shell of such configuration as to support high-frequency oscillations at substantially said predetermined frequency, said movable shell being so movably mounted relative to said fixed shell as to provide a cavity tunable over a predetermined range of frequencies.

2. A tunable cavity for high-frequency generator devices, comprising: a conductive, cylindrical housing having an evacuated chamber; an evacuated, fixed conductive shell disposed within said chamber integrally formed with said housing and of such configuration as to support high-frequency oscillations at a predetermined frequency; an evacuated, movable conductive shell disposed within said chamber and of said such configuration as to support high-frequency oscillations at substantially said predetermined frequency, said movable shell so movably mounted relative to said fixed shell as to provide a cavity tunable over a predetermined range of frequencies; and a resilient bellows coupled between said housing and said movable shell to seal off said evacuated chamber while enabling the position of said movable shell to be adjusted without affecting said evacuated chamber.

3. A tunable cavity for high-frequency generator devices, comprising: a cylindrical, conductive housing; a fixed, hollow metallic cylinder of such configuration as to support high frequency oscillations at a predetermined frequency, said cylinder being enclosed at one end and disposed within said housing and integrally formed therewith, said enclosed end having an opening formed therein for coupling said cylinder to a source of high-frequency energy; and a movable, hollow metallic cylinder of such configuration as to support high frequency oscillations at substantially said predetermined frequency, said movable cylinder being enclosed at one end and disposed within said housing with its open end adjacent the open end of said fixed cylinder, said movable cylinder being so movably mounted relative to said fixed cylinder as to provide a cavity tunable over a predetermined range of frequencies.

4. A tunable cavity for high-frequency generator devices, comprising: a cylindrical, conductive housing; a fixed, hollow, metallic cylinder of such configuration as to support high frequency oscillations at a predetermined frequency, said cylinder being enclosed at one end and disposed within said housing and integrally formed therewith, said enclosed end having an opening formed therein for coupling said cylinder to a source of high-frequency energy; a movable, hollow metallic cylinder of such configuration as to support high frequency oscillations at substantially said predetermined frequency, said movable cylinder being enclosed at one end and disposed within said housing with its open end adjacent the open end of said fixed cylinder, said movable cylinder being so movably mounted relative to said fixed cylinder as to provide a cavity tunable over a predetermined range of frequencies; and a transformer coupling said opening in said fixed cylinder and said enclosed end to provide a suitable impedance match to an output coupling device.

5. A tunable cavity for high-frequency generator devices, comprising: a hollow, metallic, cylindrical housing; a fixed, hollow, metallic cylinder, having a predetermined inner-diameter, integrally formed and coaxial with said housing, the configuration of said cylinder being so chosen as to support high frequency oscillations at a predetermined frequency, and an end of said cylinder being substantially enclosed while having an opening therein to provide a coupling to an external source of energy; a movable, hollow, metallic cylinder of such configuration as to support high frequency oscillations at substantially said predetermined frequency, said movable cylinder being enclosed at one end and having the same said predetermined inner-diameter; a bearing member affixed to said housing; a shaft member affixed to said movable cylinder and extending through said bearing member; a resilient bellows coupled between said bearing member and said movable cylinder to provide an evacuated chamber within said housing; and means rotatably mounted relative to said housing and said shaft and adapted to move said shaft and said movable cylinder axially in opposition to said resilient bellows to provide a cavity tunable over a predetermined range of frequencies.

References Cited in the file of this patent

UNITED STATES PATENTS

| | | |
|---|---|---|
| 2,642,494 | Zaslavsky | June 16, 1953 |
| 2,699,519 | Bruck | Jan. 11, 1955 |
| 2,752,576 | Hilliard | June 26, 1956 |